(12) United States Patent
Tokumaru et al.

(10) Patent No.: US 11,625,331 B2
(45) Date of Patent: Apr. 11, 2023

(54) CACHE CONTROL APPARATUS AND CACHE SYSTEM CONTROL METHOD

(71) Applicant: FUJITSU LIMITED, Kawasaki (JP)

(72) Inventors: Ryotaro Tokumaru, Higashikurume (JP); Masakazu Tanomoto, Kawasaki (JP); Taisuke Saiki, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 38 days.

(21) Appl. No.: 17/229,904

(22) Filed: Apr. 14, 2021

(65) Prior Publication Data

US 2022/0012179 A1    Jan. 13, 2022

(30) Foreign Application Priority Data

Jul. 8, 2020 (JP) .............................. JP2020-117507

(51) Int. Cl.
| | |
|---|---|
| *G06F 11/10* | (2006.01) |
| *G06F 12/0875* | (2016.01) |
| *G06F 12/0846* | (2016.01) |
| *G06F 11/07* | (2006.01) |
| *G06F 9/38* | (2018.01) |
| *G06F 11/30* | (2006.01) |
| *G06F 9/30* | (2018.01) |
| *G06F 12/0853* | (2016.01) |

(52) U.S. Cl.
CPC ...... *G06F 12/0875* (2013.01); *G06F 9/30047* (2013.01); *G06F 9/3836* (2013.01); *G06F 11/0772* (2013.01); *G06F 11/1064* (2013.01); *G06F 11/3037* (2013.01); *G06F 12/0846* (2013.01); *G06F 12/0853* (2013.01)

(58) Field of Classification Search
CPC ............. G06F 11/1064; G06F 11/0772; G06F 12/0853; G06F 11/073
See application file for complete search history.

(56) References Cited

U.S. PATENT DOCUMENTS

| | | | | |
|---|---|---|---|---|
| 7,124,236 | B1 * | 10/2006 | Tan ..................... | G06F 12/0853 711/131 |
| 2006/0010354 | A1 * | 1/2006 | Azevedo ............... | G06F 21/563 714/48 |
| 2007/0079184 | A1 * | 4/2007 | Weiss ..................... | G11C 29/72 714/718 |
| 2008/0163029 | A1 | 7/2008 | Hirano et al. | |
| 2008/0282037 | A1 * | 11/2008 | Kusachi .............. | G06F 12/0846 711/133 |

(Continued)

FOREIGN PATENT DOCUMENTS

| | | |
|---|---|---|
| JP | 2008-065370 A | 3/2008 |
| JP | 2008-165449 A | 7/2008 |
| JP | 2014-197402 A | 10/2014 |

*Primary Examiner* — Yolanda L Wilson
(74) *Attorney, Agent, or Firm* — Fujitsu Patent Center

(57) ABSTRACT

A cache control apparatus includes a data unit configured to store data on an index-specific basis, a tag unit configured to store, on the index-specific basis, a tag and a flag indicating whether the data has an uncorrectable error, and a control unit configured to refer to the flag, upon detecting a tag hit by performing a read access to the tag unit, to determine whether an uncorrectable error exists in the data corresponding to the tag hit, wherein the control unit performs process scheduling such that the read access to the tag unit and another access to the tag unit are performed simultaneously.

4 Claims, 7 Drawing Sheets

(56) References Cited

U.S. PATENT DOCUMENTS

2012/0311379 A1\* 12/2012 Moyer .................. G06F 12/084
  714/6.11
2013/0170334 A1   7/2013 Koinuma et al.
2020/0293402 A1\* 9/2020 Otterstedt ........... G06F 11/1076

\* cited by examiner

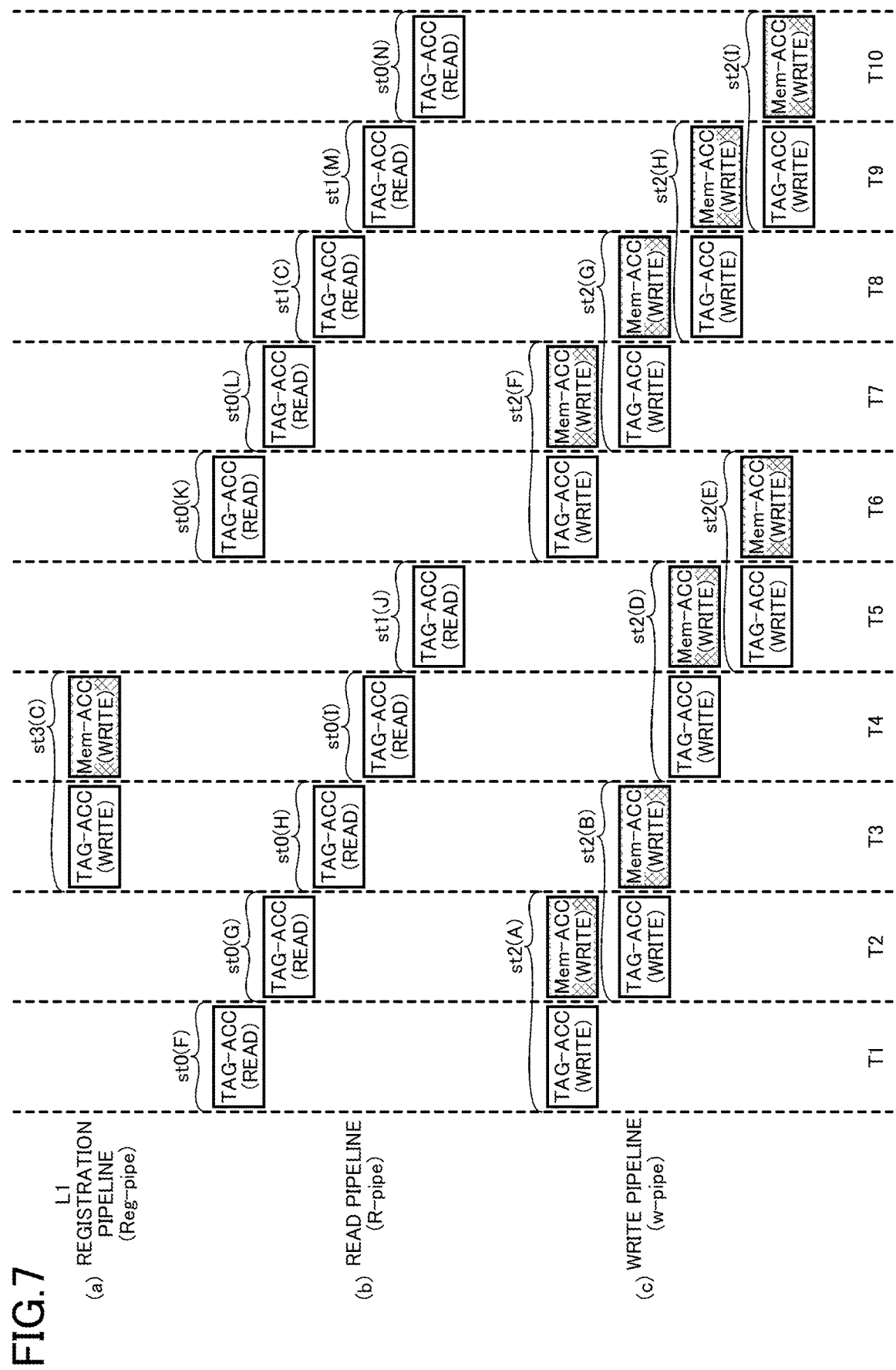

CACHE CONTROL APPARATUS AND CACHE SYSTEM CONTROL METHOD

CROSS-REFERENCE TO RELATED APPLICATIONS

The present application is based upon and claims the benefit of priority from the prior Japanese Patent Application No. 2020-117507 filed on Jul. 8, 2020, with the Japanese Patent Office, the entire contents of which are incorporated herein by reference.

FIELD

The disclosures herein relate to a cache control apparatus and a cache system control method.

BACKGROUND

In a cache system, issuing a store instruction from an instruction control unit to an L1 cache causes the tag unit of the L1 cache to be accessed and searched to find whether an address matching the store address of the store instruction is present in the tag unit. Upon determining that a matching address exists in the tag unit, i.e., the occurrence of a tag hit, the data unit of the L1 cache is accessed, and data is written (stored) therein. In so doing, for the purpose of avoiding writing to an address where an error exists, data may be first read from the write address in the data unit to calculate an error correction code of the read data, thereby checking whether an uncorrectable error exists. Upon confirming that there is no uncorrectable error, data is written to the write address in the data unit.

Processor architectures used in recent years include a super-scalar architecture. This is the architecture which achieves increased processing speed by performing processes in a plurality of pipelines in a staggered manner such that a given process in a given pipeline is different from processes in other pipelines. However, the data unit of the L1 cache in a typical processor is implemented as a RAM, so that two access operations in two pipelines cannot be performed simultaneously on the data unit.

For example, while a write operation is performed on to the data unit with respect to a store instruction in one pipeline, a read operation on the data unit for the purpose of checking an uncorrectable error cannot be performed with respect to a subsequent store instruction in the other pipeline. Because of this, there is a need to adjust operation timing between the subsequent store instruction and the preceding store instruction so as to avoid collision, which results in the lowering of processing efficiency in the pipelines. Such a reduction in processing efficiency becomes increasingly noticeable as the number of consecutive store instructions increases, and may significantly affect the overall performance of a processor.

RELATED-ART DOCUMENTS

Patent Document

[Patent Document 1] Japanese Laid-open Patent Publication No. 2008-065370
[Patent Document 2] Japanese Laid-open Patent Publication No. 2014-197402
[Patent Document 3] Japanese Laid-open Patent Publication No. 2008-165449

SUMMARY

According to an aspect of the embodiment, a cache control apparatus includes a data unit configured to store data on an index-specific basis, a tag unit configured to store, on the index-specific basis, a tag and a flag indicating whether the data has an uncorrectable error, and a control unit configured to refer to the flag, upon detecting a tag hit by performing a read access to the tag unit, to determine whether an uncorrectable error exists in the data corresponding to the tag hit, wherein the control unit performs process scheduling such that the read access to the tag unit and another access to the tag unit are performed simultaneously.

The object and advantages of the embodiment will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 7 is a drawing illustrating an example of pipeline processes when store instructions are performed according to the procedure illustrated in FIG. 6.

DESCRIPTION OF EMBODIMENTS

In order to facilitate the understanding of technology of the present disclosures, a description will first be given with respect to the situation in which adjustment of operation timing becomes necessary between a preceding store instruction and a subsequent store instruction.

Figure 1:
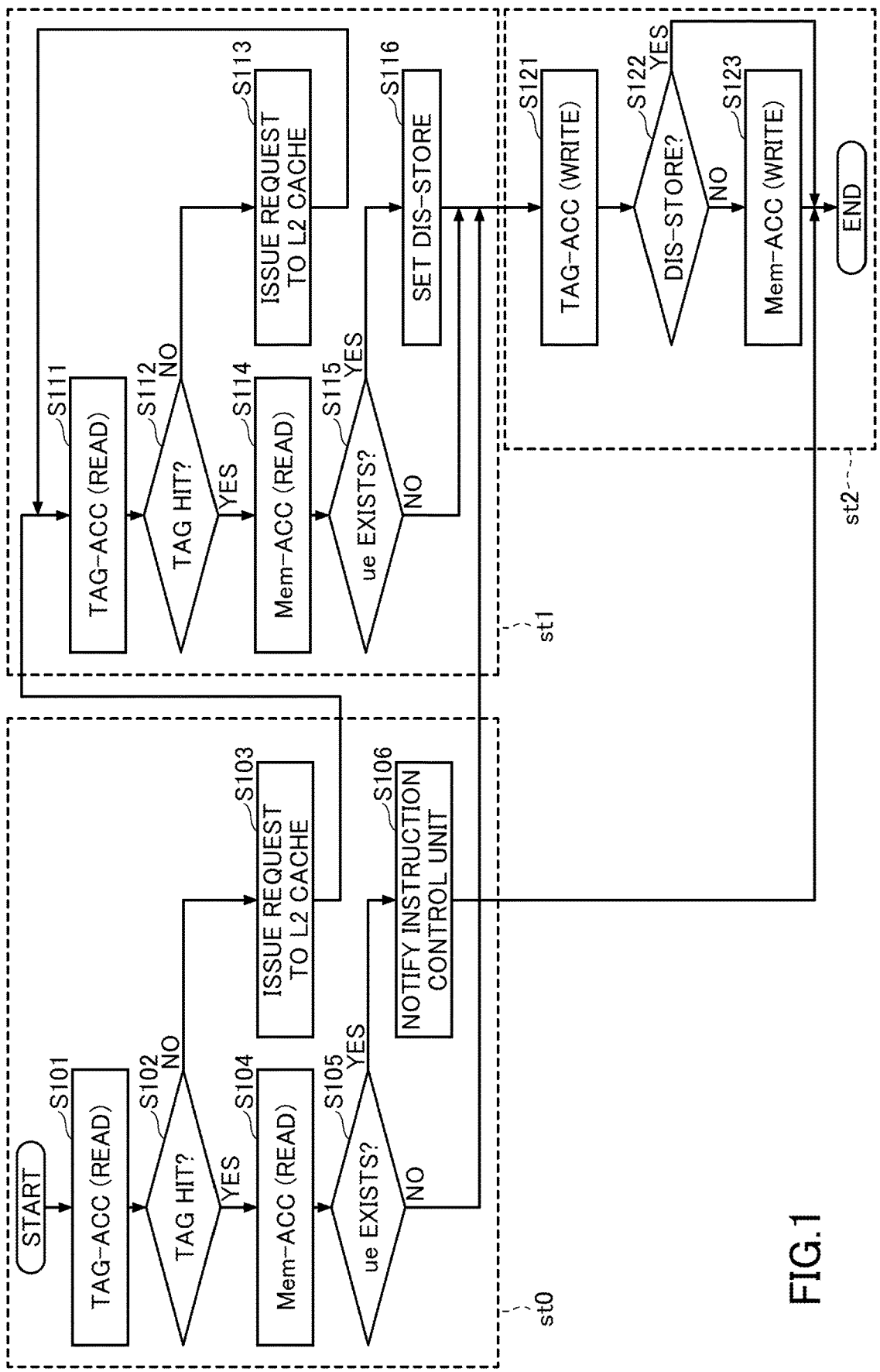
FIG. 1 is a drawing illustrating an example of the procedure of executing a store instruction in a related-art cache memory.

FIG. 1 is a drawing illustrating an example of the procedure of executing a store instruction in a related-art cache memory; The steps of the procedure illustrated in FIG. 1 is performed by a control unit provided in an L1 cache.

In step S101, upon a store instruction being issued from an instruction control unit to an L1 cache, a control unit performs an access operation (TAG-ACC) with respect to the tag unit of the L1 cache to read the contents of the tag unit. In step S102, the control unit determines whether an address matching the write address of the store instruction is present in the tag unit, i.e., determines whether a tag hit occurs.

Upon determining that no tag hit occurs (i.e., a tag miss occurs) (i.e., in the case of NO in step S102), the control unit in step S103 issues a data request to an L2 cache. Upon determining that a tag hit occurs (i.e., in the case of YES in step S102), the control unit in step S104 performs a data access operation (Mem-ACC) with respect to the data unit to retrieve data from the data unit.

In step S105, the control unit determines whether there is an uncorrectable error (ue) in the retrieved data. In so doing, the control unit computes an error correction code of the retrieved data in order to determine whether ue exists in the retrieved data. Data in the data unit includes 128-byte data corresponding to each of the plurality of ways when there are multiple ways, and information is copied 128 bytes at a time from the main memory device to the L1 cache. That is, data is registered in units of 128 bytes in the data unit. When determining in step S105 whether ue exists, the entirety of 128 bytes is checked together to determine whether ue exists.

Upon determining that ue is nonexistent (in the case of NO in step S105), the procedure proceeds to step S121. Upon determining that ue exists (in the case of YES in step S105), the procedure proceeds to step S106. In step S106, the control unit notifies the instruction control unit of the existence of ue, and, then, brings the procedure to an end. Upon being notified that ue exists, the instruction control unit may have various options as to what control procedure it employs. For example, the instruction control unit may instruct the cache to evict the data that is found to have ue, to the main memory in order to ensure data coherency. Thereafter, the instruction control unit may issue the same store instruction again.

A series of processes from step S101 to step S106 described above will be referred to as a store process st0 in the following description.

After issuing a data request to the L2 cache, the control unit in step S111 performs an access operation (TAG-ACC) with respect to the tag unit in the L1 cache, thereby reading the content of the tag unit. In step S112, the control unit determines whether an address matching the write address of the store instruction is present in the tag unit, i.e., determines whether a tag hit occurs.

Finding that no tag hit occurs (i.e., a tag miss occurs) (i.e., in the case of NO in step S112) means that the replacement data to be written by the store instruction has not yet arrived at the L1 cache, and the current state is a data waiting state. In this case, the control unit in step S113 issues a data request to the L2 cache. The procedure then returns to step S111.

Upon determining that a tag hit occurs (i.e., in the case of YES in step S112), the control unit in step S114 performs a data access operation (Mem-ACC) with respect to the data unit to retrieve data from the data unit.

In step S115, the control unit determines whether there is ue in the retrieved data. In so doing, the control unit computes an error correction code of the retrieved data in order to determine whether ue exists in the retrieved data. At this time, an error correction code is calculated for each of the 128 bytes in the retrieved data. In other words, an error correction code is calculated separately for each byte (8 bits). When determining in step S115 whether ue exists, a check as to whether ue exists is made with respect to the byte locations which are to be written by the store instruction (e.g., the upper 64 bytes among the 128 bytes). Whether or not ue exists in bytes other than the bytes to foe written does not affect the outcome of determination in step S115.

Upon determining that ue is nonexistent (in the case of NO in step S115), the procedure proceeds to step S121. Upon determining that ue exists (in the case of YES in step S115), the procedure proceeds to step S116. In step S116, the control unit is unable to use the data to be replaced by the store instruction because of the presence of ue, i.e., is unable to perform the write operation required by the store instruction. The control unit thus sets dis-store information (DIS STORE) indicating that store is unable to be performed.

A series of processes from step S111 to step S116 described above will be referred to as a store process st1 in the following description.

Thereafter in step S121, the control unit performs an access operation (TAG-ACC) with respect to the tag unit in the L1 cache, thereby writing to the tag unit. Specifically, an update operation is performed to update the state information stored in the tag unit (e.g., information indicative of one of the four states, i.e., modified, exclusive, shared, and invalid).

In step S122, the control unit determines whether dis-store information has been set (whether DIS STORE exists). When dis-store information has not been set, the procedure proceeds to step S123. When dis-store information has been set, the procedure comes to an end because the store instruction cannot be performed.

In step S123, the control unit performs a data access operation (Mem-ACC) with respect to the data unit to write the store data in the data unit. With this, the procedure comes to an end.

A series of processes from step S121 to step S123 described above will be referred to as a store process st2 in the following description.

Figure 2:
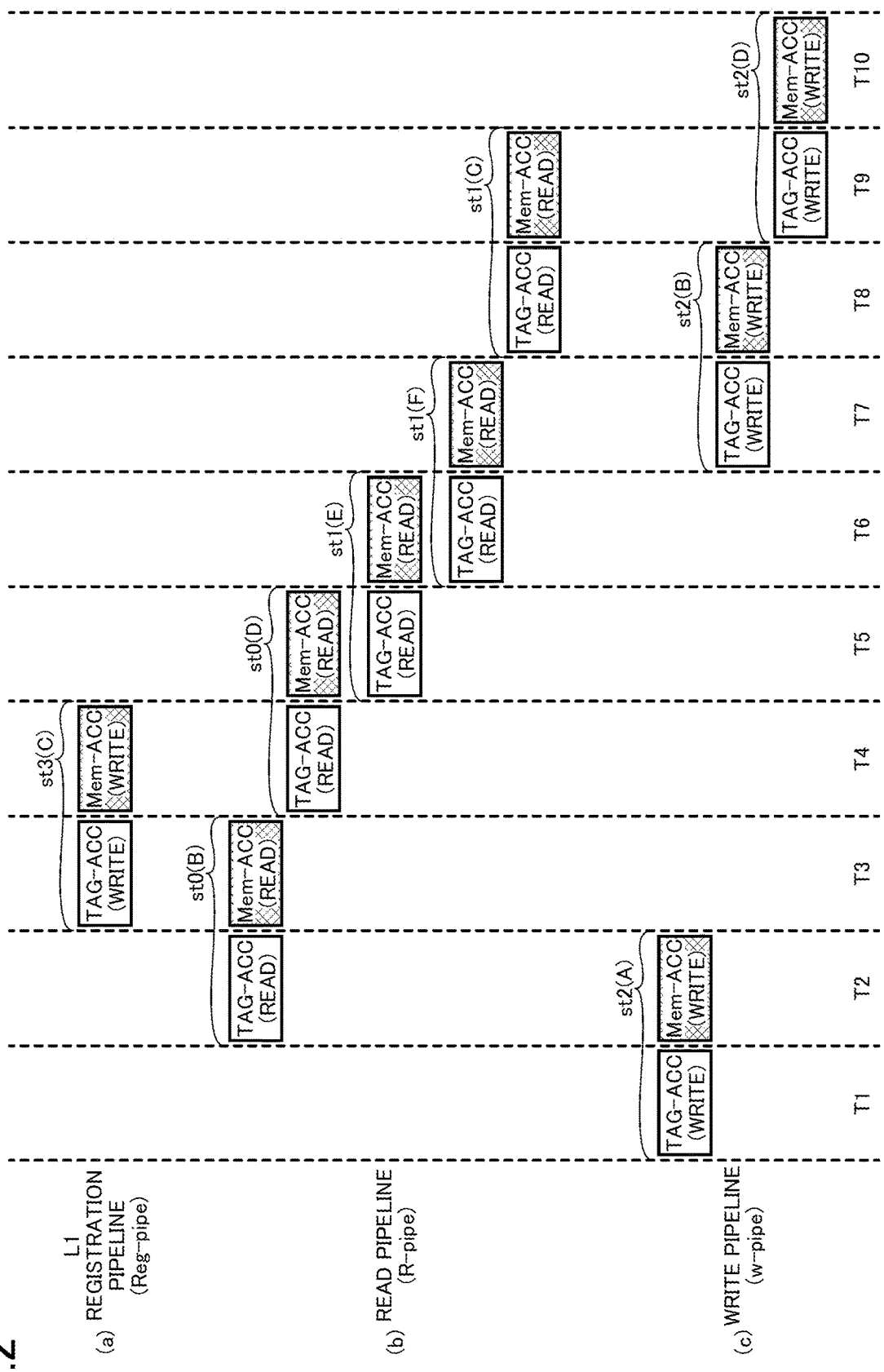
FIG. 2 is a drawing illustrating an example of pipeline processes when store instructions are performed according to the procedure illustrated in FIG. 1.

FIG. 2 is a drawing illustrating an example of pipeline processes when store instructions are performed according to the procedure illustrated in FIG. 1. The example illustrated in FIG. 2 demonstrate how pipeline processes are performed by the L1 registration pipeline (Reg-pipe) illustrated in (a), the read pipeline (R-pipe) illustrated in (b), and the write pipeline (w-pipe) illustrated in (c)

In FIG. 2, "st0(X)" refers to the store process st0 associated with the execution of the X-th store instruction (or the store instruction specified by the symbol X). Further, "st1 (X)" refers to the store process st1 associated with the execution of the X-th store instruction (or the store instruction specified by the symbol X). Moreover, "st2(X)" refers to the store process st2 associated with the execution of the X-th store instruction (or the store instruction specified by the symbol X).

Further, the process of registering data, from the L2 cache, in the tag unit and data unit of the L1 cache is referred to as a store process st3. In FIG. 2, "st3(X)" refers to the store process st3 associated with the execution of the X-th store instruction (or the store instruction specified by the symbol X).

For example, st2(A) refers to the store process st2 of the first store instruction (i.e., store instruction A), and st0(B) refers to the store process st0 of the second store instruction (i.e., store instruction 8). Moreover, st3(C) refers to the store process st3 of the third store instruction (i.e., store instruction C), and st1(E) refers to the store process st1 of the fifth store instruction (i.e., store instruction E).

In the L1 registration pipeline, store processes st3 are successively performed. In the read pipeline, store processes st0 and store processes st1 are successively performed, and are each constituted by a read access to the tag unit and a read access to the data unit. In the write pipeline, store processes st2 are successively performed, and are each constituted by a write access to the tag unit and a write access to the data unit.

At timings T3 and T4, for example, the store process st3(C) is performed with respect to the store instruction C, which results in data from the L2 cache being registered and written to the tag unit and the data unit. At subsequent timings T8 and T9, the store process st1(C) with respect to the noted store instruction C is performed, so that a read from the tag unit for hit/miss determination and a read from the data unit for ue determination are performed.

Only one access operation (Mem-ACC) can be performed at a time with respect to the data unit implemented as a RAM as previously described. Because of this, the store processes in the respective pipelines need to be staggered as illustrated in FIG. 2 such that the access operations (Mem-ACC) of the store processes st0, st1, st2, and st3 do not overlap at the same timing.

The four store processes st0, st1, st2, and st3 are processes of different phases performed with respect to one store instruction, so that it is preferable that at least some of the four store processes are performed simultaneously in order to efficiently execute the pipelines. The technology of the present disclosures which will be described below provides a configuration in which at least some of the four store processes can be performed simultaneously.

In the following, embodiments of the invention will be described with reference to the accompanying drawings.

Figure 3:
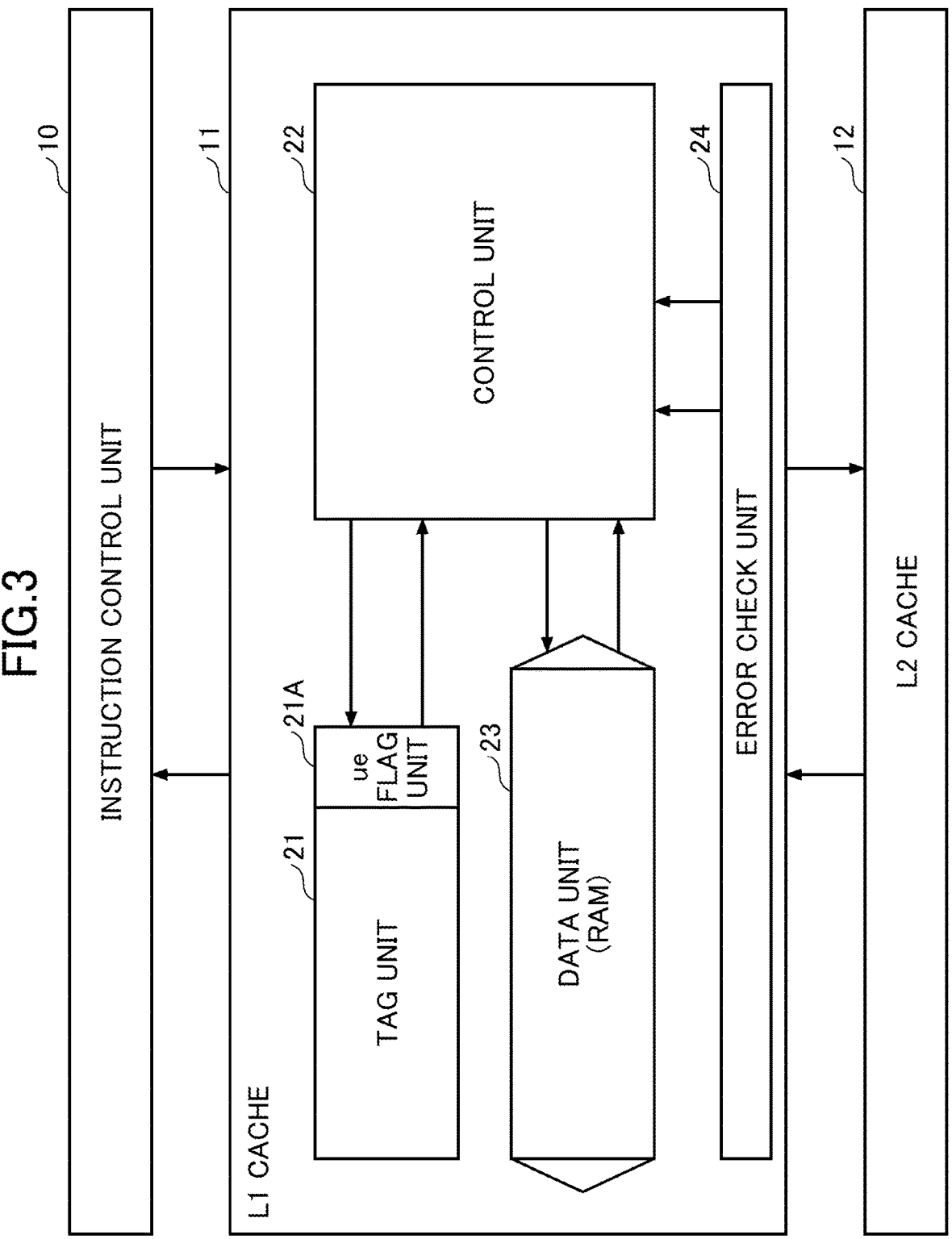
FIG. 3 is a drawing illustrating an example of the configuration of a cache system according to an embodiment.

FIG. 3 is a drawing illustrating an example of the configuration of a cache system according to an embodiment. In FIG. 3, boundaries between functional or circuit blocks illustrated as boxes basically indicate functional boundaries, and may not correspond to separation in terms of physical positions, separation in terms of electrical signals, separation in terms of control logic, etc. Each functional or circuit block may be a hardware module that is physically separated from other blocks to some extent, or may indicate a function in a hardware module in which this and other blocks are physically combined together.

The cache system illustrated in FIG. 3 includes an instruction control unit 10, an L1 cache 11, and an L2 cache 12. The instruction control unit 10 and the L1 cache 11 may be implemented as a cache control apparatus. The cache control apparatus may be connected to an arithmetic unit (not shown) which executes an instruction to perform an arithmetic operation with respect to data. The L2 cache may also be included in the cache control apparatus. The L2 cache may further be connected to a main memory device (not shown).

The instruction control unit 10 issues an access request such as a load instruction and a store instruction to the L1 cache 11, thereby performing a data load and a data store with respect, to the L1 cache 11. Data written by the store instruction is supplied from the arithmetic unit to the L1 cache 11, and data read by the load instruction is supplied from the L1 cache 11 to the arithmetic unit.

The L1 cache 11, L2 cache 12, and the main memory device form a hierarchical memory structure. If an access does not hit in the L1 cache 11, an access to the L2 cache 12 is performed. If the access to the L2 cache 12 does not hit, an access to the main memory device is performed. In this manner, the occurrence of a cache miss causes an access to be performed with respect to a lower layer memory, so that data requested by the access and stored in the lower layer memory is transferred to the L1 cache 11.

The L1 cache 11 includes a tag unit 21, a control unit 22, a data unit 23, and an error check unit 24. Of all the bits representing an access address, a predetermined number of lower-order bits serves as an index, and the remaining higher-order bits serves as a tag. The tag unit 21 stores tags corresponding to indexes. In the case of a four-way configuration having four ways, for example, four tags corresponding to four ways are stored with respect to each index.

The tag unit 21 is implemented as a latch group (flip-flop group), and is configured such that a plurality of accesses (for example, two accesses) can be performed simultaneously. More specifically, at least one read access and one write access can be performed simultaneously. In contrast, the data unit 23 is implemented as a RAM, and does not allow multiple accesses to be performed simultaneously.

When an access request such as a store instruction and a load instruction is supplied from the instruction control unit 10, the control unit 22 supplies to the tag unit 21 an address indicative of an access address in the access request. The tag unit 21 uses the index portion of the address to output one or more tags at the corresponding index of the tag unit 21. When there are four ways, for example, four tags are output.

The control unit 22 compares the four tags, for example, output from the tag unit 21 with the tag portion of the access address to check whether the bit patterns of these tags match. When a match is found with respect to any one of the tags, the access entails a tag hit. When no match is found with respect to any one of the tags output from the tag unit 21, the access entails a tag miss.

The data unit 23 is a RAM which stores data on an index-specific basis. When there are four ways, for example, the data units 23 may be provided in one-to-one correspondence with the four respective ways. The control unit 22 accesses the data unit 23 corresponding to the way that hits, thereby performing a data write or a data read with respect to a memory area corresponding to the index portion of the access address. The data of the data unit 23 includes 128-byte data, for example, stored on an index-specific basis for each of the plurality of ways in the case of a multi-way configuration. In this case, information is copied 128 bytes at a time from the L2 cache 12 to the L1 cache 11. Namely, data is registered in units of 128 bytes in the data unit 23. In the following, a description will be given by using an example in which the data length of data stored in the data unit 23 is 128 bytes.

Upon detecting a tag miss, the control unit 22 issues a data request to the L2 cache 12. When 128-byte data arrives from the L2 cache 12 in response to this data request, the data is first supplied to the error check unit 24. The error check unit 24 calculates an error correction code for the entire 128 bytes to generate an ue flag indicating whether the 128-byte data is uncorrectable or not. The ue flag may be one-bit data that assumes a value of 0 indicative of a correctable or error-free state, and that assumes a value of 1 indicative of an uncorrectable state, for example. The generated ue flag is supplied to the control unit 22 together with information indicating whether an error exists.

Redundant bits for error correction may be added to the 128-byte information bits which are the 128-byte data. The error check unit 24 may calculate check bits (i.e., error correction code) having the same length as the redundant bits based on the information bits. The error check unit 24 can specify an error position based on the result of bitwise comparison between the calculated check bits and the redundant bits. The bit value of the information bit at the specified error position may be inverted to correct the error. When the Hamming code is used for error correction, for example, error correction is possible upon the occurrence of one-bit error in the code, while error detection is possible but error correction is not possible upon the occurrence of two-bit errors.

The control unit 22 stores the data from the L2 cache 12 in the area of the data unit 23 at a corresponding index location, and writes a tag in the area of the tag unit 21 at a corresponding index location to perform data registration.

The control unit 22 further receives the 1-bit ue flag from the error check unit 24, and stores the ue flag in the ue flag unit 21A of the tag unit 21 such that the ue flag is associated with the index of the tag unit 21. In the present embodiment, a single one-bit ue flag may be stored in the ue flag unit 21A for each index and for each way (i.e., for each 128-byte data).

When registering data in the L1 cache 11, the control unit 22 may always write the generated ue flag to the ue flag unit 21A of the tag unit 21 without exception (i.e., regardless of the state which has caused data registration). The control unit 22 writes an ue flag having a value such as 0 to the ue flag unit 21A in the case of occurrence of no error, and writes an ue flag having a value such as 1 to the ue flag unit 21A in the case of occurrence of an error.

As described above in the present embodiment, the ue flag unit 21A provided in the tag unit 21 stores a we flag indicative of an uncorrectable error state. In other words, the tag unit 21 stores, for each index (and for each way), a tag and a flag indicating whether data corresponding to the tag has an uncorrectable error. With this arrangement, the control unit 22 can refer to a ue flag to determine whether an uncorrectable error exists in the data corresponding to a tag hit upon the tag hit being detected during a read access to the tag unit 21. Namely, the control unit 22 reads a ue flag when performing a read access to the tag unit 21 to detect either a tag hit or a tag miss, and checks the ue flag in the case of a tag hit. This allows a check to be made as to whether the 128-byte data to be accessed is uncorrectable (i.e., broken). With this arrangement, there is no need for the control unit 22 to perform a read access to the data unit 23 to calculate an error correction code based on read data as in the case of the related art illustrated in FIG. 1 for the purpose of determining whether the 128-byte data to be accessed is uncorrectable.

As was previously described, the data unit 23 is implemented as a RAM, and does not allow multiple accesses to be performed simultaneously. In contrast, the tag unit 21 allows multiple accesses (e.g., one read access and one write access) to be performed simultaneously. The above-noted arrangement thus allows the control unit 22 to schedule processes such that a read access to the tag unit 21 (i.e., an operation which does not entail a subsequent access to the data unit) and another access (i.e., an operation entailing a subsequent access to the data unit) are performed simultaneously.

Figure 4:
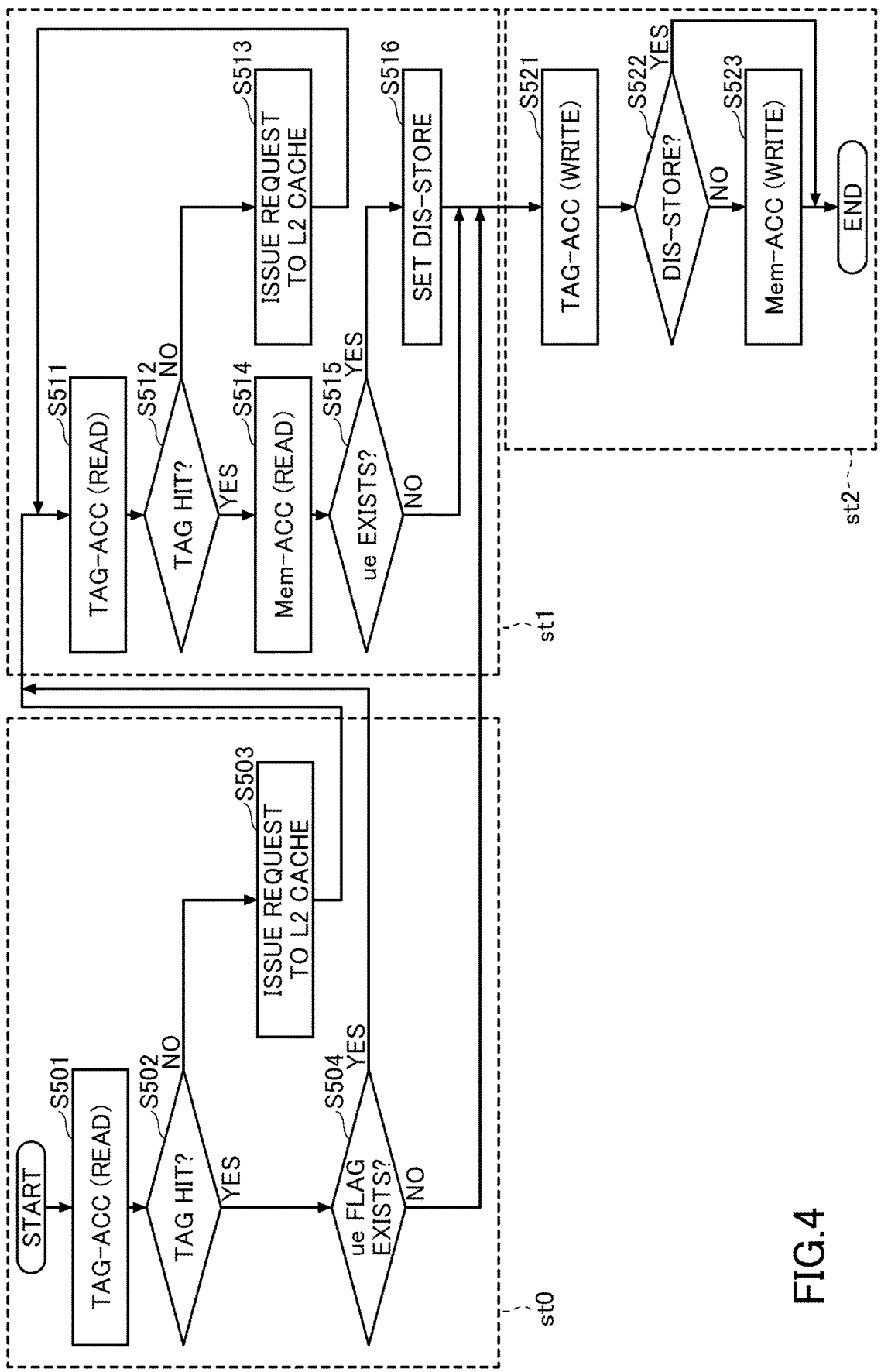
FIG. 4 is a drawing illustrating an example of the procedure of executing a store instruction in the cache memory illustrated in FIG. 3.

FIG. 4 is a drawing illustrating an example of the procedure of executing a store instruction in the cache memory illustrated in FIG. 3. The steps of the procedure illustrated in FIG. 4 is performed by the control unit 22 provided in the L1 cache.

It may be noted that, in FIG. 4 and the subsequent similar flowcharts, an order in which the steps illustrated in the flowchart are performed is only an example. The scope of the disclosed technology is not limited to the disclosed order. For example, a description may explain that an A step is performed before a B step is performed. Despite such a description, it may be physically and logically possible to perform the B step before the A step while it is possible to perform the A step before the B step. In such a case, ail the consequences that affect the outcomes of the flowchart may be the same regardless of which step is performed first. It then follows that, for the purposes of the disclosed technology, it is apparent that the B step can be performed before the A step is performed. Despite the explanation that the A step is performed before the B step, such a description is not intended to place the obvious case as described above outside the scope of the disclosed technology. Such an obvious case inevitably falls within the scope of the technology intended by this disclosure.

In step S501, upon a store instruction being issued from the instruction control unit 10 to the L1 cache 11, the control unit 22 performs an access operation (TAG-ACC) with respect to the tag unit 21 of the L1 cache 11 to read the contents of the tag unit 21. In so doing, the control unit 22 reads from the tag unit 21 a tag corresponding to the index portion of the write address supplied from the instruction control unit 10, and also reads from the ue flag unit 21A a ue flag corresponding to such an index portion. In step S502, the control unit 22 determines whether a tag matching the tag portion of the write address of the store instruction is present in the tag unit 21, i.e., determines whether a tag hit occurs.

Upon determining that no tag hit occurs (i.e., a tag miss occurs) (i.e., in the case of NO in step S502), the control unit 22 in step S503 issues a data request to an L2 cache 12. Upon detecting a tag hit (in the case of YES in step S502), the control unit 22 in step S504 determines whether there is a ue flag indicative of an uncorrectable state, i.e., whether the ue flag read in step S501 has a value (e.g., 1) indicating an uncorrectable state. As was previously described, data in the data unit 23 includes 128-byte data corresponding to each of the plurality of ways when there are multiple ways, and information is copied 128 bytes at a time from the main memory device to the L1 cache 11 via the L2 cache 12. When determining in step S504 whether ue exists, the entirety of 128-byte data is checked together to determine whether ue exists.

Upon determining that ue is nonexistent (in the case of NO in step S505), the procedure proceeds to step S521. Upon determining that ue exists (in the case of YES in step S505), the procedure proceeds to step S511.

A series of processes from step S501 to step S504 described above will be referred to as a store process st0 in the following description.

In step S511, the control unit 22 performs an access operation (TAG-ACC) with respect to the tag unit 21 in the L1 cache 11, thereby reading the content of the tag unit 21. In so doing, the control unit 22 reads from the tag unit 21 a tag corresponding to the index portion of the write address supplied from the instruction control unit 10. In step S512, the control unit 22 determines whether a tag matching the tag portion of the write address of the store instruction is present in the tag unit 21, i.e., determines whether a tag hit occurs.

Finding that no tag hit occurs (i.e., a tag miss occurs) (i.e., in the case of NO in step S512) means that the replacement data to be written by the store instruction has not yet arrived at the L1 cache, and the current state is a data waiting state. In this case, the control unit 22 in step S513 issues a data request to the L2 cache 12. The procedure then returns to step S511.

Upon determining that a tag hit occurs (i.e., in the case of YES in step S512), the control unit 22 in step S514 performs a data access operation (Mem-ACC) with respect to the data unit 23 to retrieve data from the data unit 23.

In step S515, the control unit 22 determines whether there is ue in the retrieved data. In so doing, the control unit 22 causes the error check unit 24 to compute an error correction code of the retrieved data in order to determine whether ue exists in the retrieved data. At this time, an error correction code is calculated for each of the 128 bytes in the retrieved data. In other words, an error correction code is calculated for one byte (8 bits) at a time. When determining in step S515 whether ue exists, a check as to whether ue exists is made with respect to the byte locations which are to be written by the store instruction (e.g., the upper 64 bytes among the 128 bytes). Whether or net ue exists in bytes other than the bytes to be written does not affect the outcome of determination in step S515.

Upon determining that ue is nonexistent (in the case of NO in step S515), the procedure proceeds to step S521. Upon determining that ue exists (in the case of YES in step S515), the procedure proceeds to step S516. In step S516, the control unit 22 is unable to use the data to be replaced by the store instruction because of the presence of ue, i.e., is unable to perform the write operation required by the store instruction. The control unit thus sets dis-store information (DIS STORE) indicating that store is unable to be performed.

A series of processes from step S511 to step S516 described above will be referred to as a store process st1 in the following description.

Thereafter in step S521, the control unit 22 performs an access operation (TAG-ACC) with respect to the tag unit 21 in the L1 cache 11, thereby writing to the tag unit 21. Specifically, an update operation is performed to update the state information stored in the tag unit 21 (e.g., information indicative of one of the four states, i.e., modified, exclusive, shared, and invalid).

In step S522, the control unit 22 determines whether dis-store information has been set (whether DIS STORE exists). When dis-store information has not been set, the procedure proceeds to step S523. When dis-store information has been set, the procedure comes to an end because the store instruction cannot be performed.

In step S523, the control unit 22 performs a data access operation (Mem-ACC) with respect to the data unit 23 to write the store data in the data unit 23, With this, the procedure comes to an end.

A series of processes from step S521 to step S523 described above will be referred to as a store process st2 in the following description.

Figure 5:
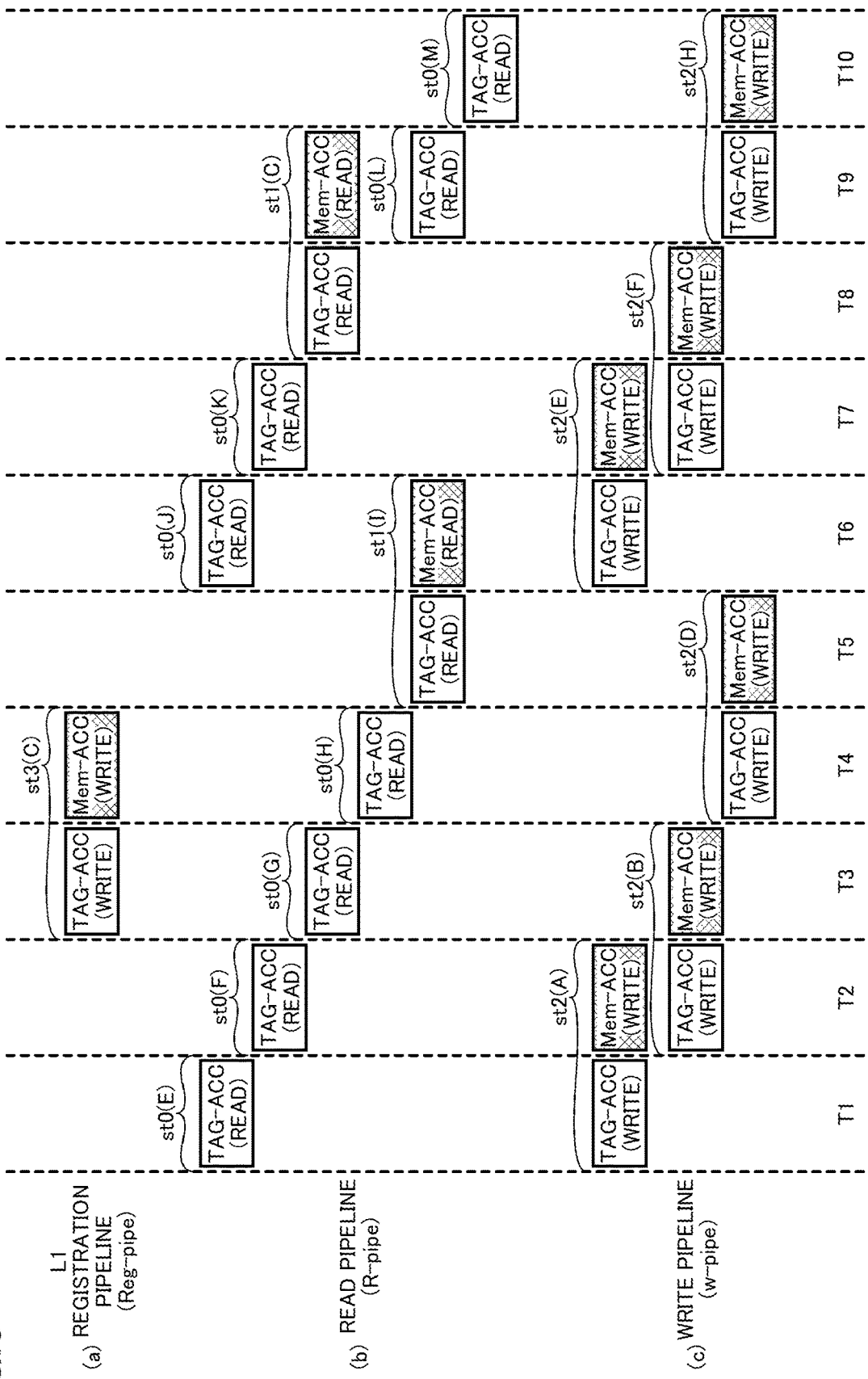
FIG. 5 is a drawing illustrating an example of pipeline processes when store instructions are performed according to the procedure illustrated in FIG. 4.

FIG. 5 is a drawing illustrating an example of pipeline processes when store instructions are performed according to the procedure illustrated in FIG. 4. The example illustrated in FIG. 5 demonstrate how pipeline processes are performed by the L1 registration pipeline (Reg-pipe) illustrated in (a), the read pipeline (R-pipe) illustrated in (b), and the write pipeline (w-pipe) illustrated in (c) The meaning of notations "st0(•)", "st1(•)", "st2(•)", and "st3(•)" in FIG. 5 are substantially the same as in the case of FIG. 2.

In the L1 registration pipeline, store processes st3 are successively performed. In the read pipeline, store processes st0 for performing a read access to the tag unit 21 and store processes st1 for performing a read access to the tag unit 21 and a read access to the data unit 23 are successively performed. In the write pipeline, store processes st2 for performing a write access to the tag unit 21 and a write access to the data unit 23 are successively performed. According to the present embodiment, no access to the data unit 23 is performed in the store process st0.

Only one access operation (Mem-ACC) can be performed at a time with respect to the data unit 23 implemented as a ram as previously described. Because of this, the store processes in the respective pipelines need to be staggered such that the access operations (Mem-ACC) of the store processes st1, st2, and st3 do not overlap at the same timing. However, the store process st0 does not involve a memory access operation (Mem-ACC), so that the pipelines can be scheduled without regard to a collision in memory access with the other store processes st1, st2, and st3. In other words, it is possible to perform the store processes st1, st2, and st3 simultaneously with the store process st0, which brings about improvement in processing efficiency with respect to the store processes as illustrated in FIG. 5, compared with the case illustrated in FIG. 2.

In the present embodiment as described above, the control unit 22 can schedule processes such that a read access to the tag unit 21 in the store process st0 and an access to the tag unit 21 in the other store processes are performed simultaneously. The present embodiment thus has fewer restrictions on pipeline scheduling, as compared with the related-art configuration which schedules the four store processes st0, st1, st2, and st3 such as to avoid collision therebetween. The present embodiment can thus reduce the lowering of processing efficiency caused by the adjustment of operation timing between a preceding store instruction and a subsequent store instruction, thereby improving the processing efficiency of store instructions.

In the following, variations of the above-noted embodiment will be described. The above-described embodiment is configured such that a 1-bit ue flag is stored in the ue flag unit 21A for each 128-byte data, and the value of the ue flag indicates whether the 128-byte data is uncorrectable as a whole. In other words, the tag unit 21 stores a 1-bit flag for an entirety of data equal in size to the registration unit (128 bytes) of the data unit 23. This configuration provides an advantageous result that, the circuit, size of the ue flag unit 21A is kept to the minimum necessary size. It may be noted, however, that the ue flag unit 21A is not limited to this configuration.

A variation may be such that the tag unit 21 stores a 1-bit flag for each of the sections constituting the data equal in size to the registration unit (128 bytes) of the data unit 23. For example, the ue flag unit 21A may be configured such that a 1-bit ue flag is provided separately for each 1 byte (8 bits) included in the 128-byte data, for example, to indicate whether correction is not possible. That is, 128 ue flags totaling 128 bits may be provided for each way of each index, so that the values of these ue flags may indicate whether the respective 128 bytes are uncorrectable. The number of bytes for which a 1-bit ue flag is provided may be changed as appropriate. For example, the configuration may be such that a 1-bit ue flag is provided separately for each 8 bytes.

Figure 6:
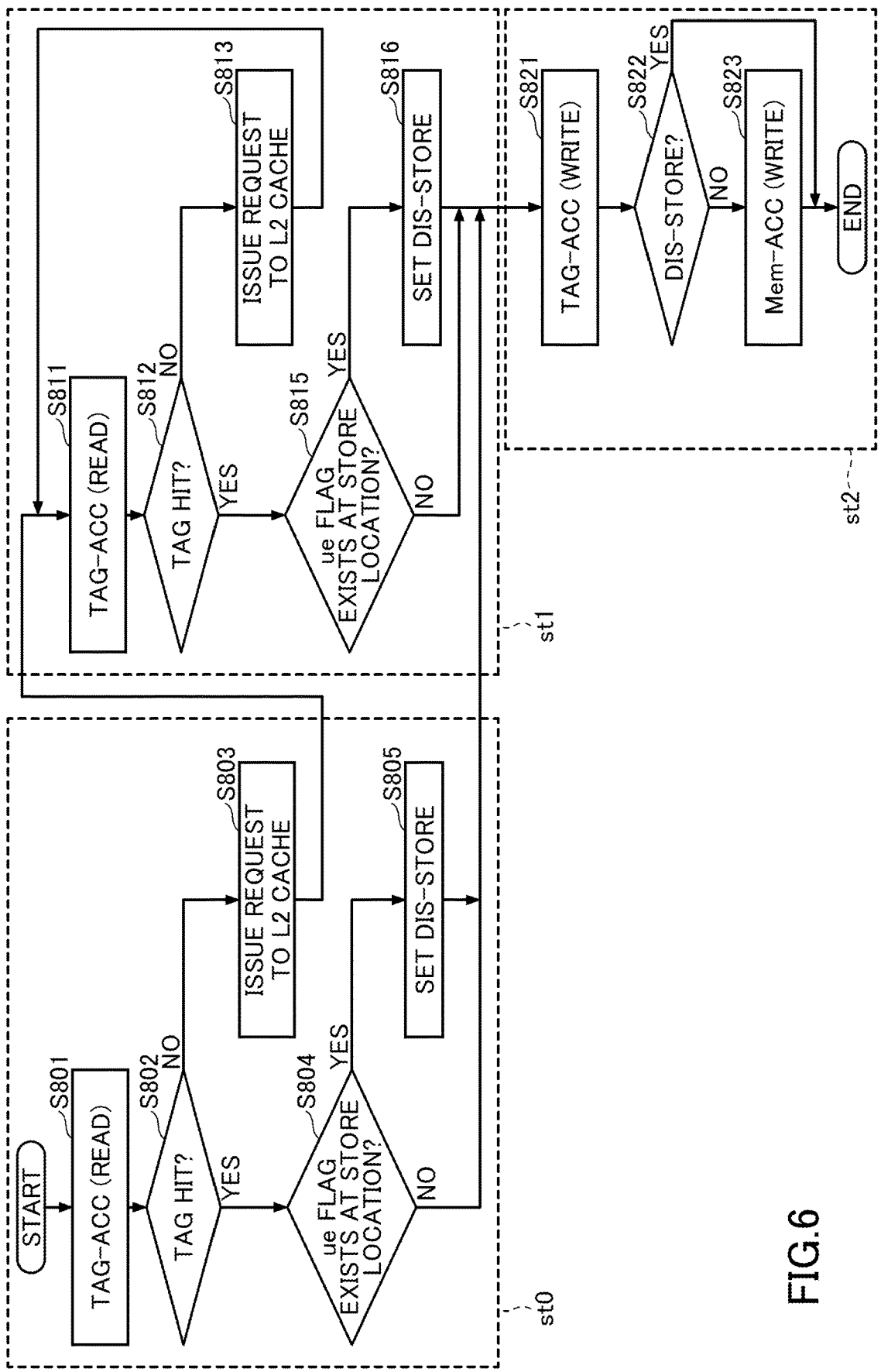
FIG. 6 is a drawing illustrating an example of the procedure of executing a store instruction in the cache memory according to a variation.

FIG. 6 is a drawing illustrating an example of the procedure of executing a store instruction in the cache memory according to the variation. In the following, a description will be given with a focus on the differences between the procedure of the variation illustrated in FIG. 6 and the procedure of the embodiment illustrated in FIG. 4.

The first difference is the determination regarding a ue flag in the store process st0. In the procedure of the embodiment illustrated in FIG. 4, step S504 of the store process st0 is one in which a 1-bit ue flag stored in the ue flag unit 21A is checked. In the procedure of the variation illustrated in FIG. 6, in contrast, step S804 of the store process st0 is one in which 128-bit ue flags stored in the ue flag unit 21A are used to perform determination. With this arrangement, the control unit 22 can determine whether ue exists with respect to the byte locations which are to be written by the store instruction (e.g., the upper 64 bytes among the 128 bytes).

Upon determining that ue is nonexistent (in the case of NO in step S804), the procedure proceeds to step S821. Upon determining that ue exists (in the case of YES in step S804), the procedure proceeds to step S805. In step S805, the control unit 22 is unable to use the data to be replaced by the store instruction because of the presence of ue, i.e., is unable to perform the write operation required by the store instruction. The control unit thus sets dis-store information (DIS STORE) indicating that store is unable to be performed. The procedure thereafter proceeds to step S821.

The second difference is the determination regarding ue in the store process st1. In the procedure of the embodiment illustrated in FIG. 4, step S514 of the store process st1 is one in which a memory access to the data unit 23 is performed. In the procedure of the variation illustrated in FIG. 6, on the other hand, the store process st1 has no step in which a memory access to the data unit 23 is performed. Further, in the procedure of the embodiment illustrated in FIG. 4, step S515 of the store process st1 is one in which an error correction code is calculated with respect to data read from the data unit 23, followed by checking whether ue exists in the byte that is to be written by the store instruction. In the procedure of the variation illustrated in FIG. 6, on the other hand, step S815 of the store process st1 is one in which 128-bit ue flags stored in the ue flag unit 21A are used to perform determination. With this arrangement, the control unit 22 can determine whether ue exists with respect to the byte locations which are to be written by the store instruction (e.g., the upper 64 bytes among the 128 bytes).

Processes in the steps other than the first difference and the second difference discussed above are not different between the procedure of the embodiment and the procedure of the variation. Due to the first difference and the second difference, dis-store information can be set by performing only a read access to the tag unit 21 (i.e., the ue flag unit 21A) while a read access to the data unit 23 was needed to set such dis-store information in the related-art configuration. Accordingly, unrestricted pipeline scheduling can be made without a need to consider, not only for the store process st0 but also for the store process st1, a memory access collision with other store processes.

FIG. 7 is a drawing illustrating an example of pipeline processes when store instructions are performed according to the procedure illustrated in FIG. 6. The example illustrated in FIG. 5 demonstrate how pipeline processes are performed by the L1 registration pipeline (Reg-pipe) illustrated in (a), the read pipeline (R-pipe) illustrated in (b), and the write pipeline (W-pipe) illustrated in (c) The meaning of notations "st0(•)", "st1(•)", "st2(•)", and "st3(•)" in FIG. 5 are substantially the same as in the case of FIG. 2.

In the L1 registration pipeline, store processes st3 are successively performed. In the read pipeline, store processes st0 and store processes st1 are successively performed, and are each constituted by a read access to the tag unit 21. In the write pipeline, store processes st2 for performing a write access to the tag unit 21 and a write access to the data unit 23 are successively performed. According to the present, embodiment, no access to the data unit 23 is performed in the store process st0 and the store process st1.

Only one access operation (Mem-ACC) can be performed at a time with respect to the data unit implemented as a RAM as previously described. Because of this, the store processes in the respective pipelines need to be staggered such that the access operations (Mem-ACC) of the store processes st2 and st3 do not overlap at the same timing. However, the store process st0 and the store process st1 do not involve a memory access operation (Mem-ACC), so that the pipelines can be scheduled without regard to a collision in memory access with the other store processes st2 and st3. In other words, it is possible to perform the store processes st2 and st3 simultaneously with the store process st0 or the store process st1, which brings about improvement in processing efficiency with respect to the store processes as illustrated in FIG. 7, compared with the case illustrated in FIG. 2 and FIG. 5. Further, since no process in the read pipeline involves a memory access, the store processes st0 and the store processes st1 can be performed continuously without any gap.

As described above, the present variation achieves fewer restrictions on pipeline scheduling, as compared with the related-art configuration in which scheduling needs to avoid collisions between the four store processes st0, st1, st2, and st3. Moreover, the present variation achieves yet fewer restrictions on pipeline scheduling, as compared with the embodiment in which scheduling avoids collisions between the three store processes st1, st2, and st3. The present variation can thus further reduce the lowering of processing efficiency caused by the adjustment of operation timing between a preceding store instruction and a subsequent store instruction, thereby further improving the processing efficiency of store instructions.

Further, although the present invention has been described with reference to the embodiments, the present invention is not limited to these embodiments, and various variations and modifications may be made without departing from the scope as defined in the claims.

For example, although the above-described embodiment, and variation have been described with respect to the use of a store instruction, the above-described configuration is equally applicable to the use of any instruction different from a store instruction, as long as the situation involves the problem of memory access collisions in pipelines.

According to at least one embodiment, a cache control apparatus is provided that reduces the lowering of processing efficiency caused by the adjustment of operation timing between a preceding store instruction and a subsequent store instruction.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A cache control apparatus, comprising:
   a data circuit configured to store data on an index-specific basis;
   a tag circuit configured to store, on the index-specific basis, a tag and a flag indicating whether the data has an uncorrectable error; and
   a control circuit configured to refer to the flag, upon detecting a tag hit by performing a read access of a store instruction to the tag circuit, to determine whether the flag indicates presence of an uncorrectable error with respect to the data corresponding to the tag hit, and to retrieve from the data circuit the data corresponding to the tag hit in response to the flag indicating the presence of the uncorrectable error, followed by calculating an error correction code of the retrieved data,
   the control circuit performs write operations of the store instruction with respect to both the data circuit and the tag circuit in response to either the flag or the error correction code indicating absence of an uncorrectable error, and the control circuit performs process scheduling such that the read access to the tag circuit and another access to the tag circuit are performed simultaneously.

2. The cache control apparatus as claimed in claim 1, wherein the flag is a 1-bit flag for an entirety of data equal in size to a unit of data registration in the data circuit.

3. A cache control apparatus, comprising:
a data circuit configured to store data on an index-specific basis;
a tag circuit configured to store, on the index-specific basis, a tag and a flag indicating whether the data has an uncorrectable error; and
a control circuit configured to refer to the flag, upon detecting a tag hit by performing a read access to the tag circuit, to determine whether an uncorrectable error exists in the data corresponding to the tag hit,
the control circuit performs process scheduling such that the read access to the tag circuit and another access to the tag circuit are performed simultaneously, and
the flag is a 1-bit flag for each of a plurality of sections that constitute data equal in size to a unit of data registration in the data circuit.

4. A method of controlling a cache system which includes a data circuit configured to store data on an index-specific basis, and a tag circuit configured to store, on the index-specific basis, a tag and a flag indicating whether the data has an uncorrectable error, comprising:
referring to the flag, upon detecting a tag hit by performing a read access of a store instruction to the tag circuit, to determine whether the flag indicates presence of an uncorrectable error with respect to the data corresponding to the tag hit, and to retrieve from the data circuit the data corresponding to the tag hit in response to the flag indicating the presence of the uncorrectable error, followed by calculating an error correction code of the retrieved data;
performing write operations of the store instruction with respect to both the data circuit and the tag circuit in response to either the flag or the error correction code indicating absence of an uncorrectable error; and
performing process scheduling such that the read access to the tag circuit and another access to the tag circuit are performed simultaneously.

\* \* \* \* \*